Patented Aug. 25, 1936

2,052,284

UNITED STATES PATENT OFFICE 2,052,284

PROCESSES FOR BREAKING PETROLEUM EMULSIONS

Melvin De Groote, St. Louis, Mo., assignor to Tretolite Company, Webster Groves, Mo., a corporation of Missouri No Drawing. Application January 24, 1936, Serial No. 60,643

10 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil" and "bottom settlings".

The object of my invention is to provide a novel and inexpensive process for separating emulsions of the character referred to into their component parts of oil and water or brine.

Briefly described, my process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

The treating agent or demulsifying agent contemplated by my process consists of or comprises an ester derived from a polyhydric alcohol and a non-sulfo, detergent-forming, monocarboxy acid, said ester having at least one free hydroxy group in the polyhydric alcohol residue and being additionally characterized by freedom from extraneous acid residues, such as residues derived from polybasic organic acids, including phthalic acid, oxalic acid, maleic acid, sebacic acid, etc.; freedom from sulfo-acid residues derived from sulfuric acid residues and sulfonic acid residues, and freedom from monobasic organic acids, such as acetic acid residues, etc.

"Non-sulfo, detergent-forming, monocarboxy acids" is a generic expression frequently used to include those organic acids which combine with alkalies such as sodium hydroxide, potassium hydroxide, or ammonium hydroxide, to form soap or soap-like bodies. The non-sulfo, detergent-forming, monocarboxy acids include the higher fatty acids commonly employed in soap making, as well as rosin acids (abietic acid) and naphthenic acids. These materials are all characterized by fairly high molecular weights in the range of approximately 200 to 500, or even higher, and are used in the manufacture of soaps or soap substitutes. The same is also true of sulfonated petroleum hydrocarbons, that is, petroleum sulfonic acids, but it is obvious that such material is not included by virtue of the expression "non-sulfo" and also the expression "monocarboxy".

As herein used, the term "polyhydric alcohols" is intended to include glycerol, ethylene glycol, and other similar glycols, and also the polyhydroxy ether alcohol type of material, such as diglycerol, triglycerol, etc. Such materials, whether produced from glycerol or from glycol, or from two dissimilar polyhydric alcohols, are characterized by the fact that dehydration produces an oxygen linkage between two organic residues, and thus the material, in addition to having the properties of a polyhydric alcohol, has to some degree at least, the properties of an ether. If desired, glycerol itself may be employed. The most desirable reagent for practising my process appears to be obtained from polyglycerol, and particularly di- or triglycerol. A mixture, of course, of various polyglycerols with or without the presence of some glycerol may be used just as well.

The expression "residue derived from a glycerol body" will be herein employed to mean derived from either glycerol or polyglycerols, and thus one may refer to either a $C_3H_5$ residue, or a $C_6H_{10}O$ residue, or the like, as a residue derived from a glycerol body. A suitable hydroxy ether body might be produced from a polyglycerol and a monohydric alcohol.

As to the manufacture of esters from an alcohol, including polyhydric alcohols, and a carboxy acid, the usual procedure is esterification in presence of dry hydrochloric acid gas. Such method is satisfactory provided that conditions are controlled so that complete esterification does not take place, and thus result in a material containing no free hydroxyl in the polyhydric alcohol residue. For example, if diglycerol is esterified with four molecules of ricinoleic acid, the resultant product will not contain a free hydroxy group in the polyglycerol residue. However, if esterification is continued so that one, two, or three ricinoleic acid residues are introduced, and so that three, two, or one free hydroxyl residues remain in the polyglycerol radical, then an effective reagent is produced. Esterifications to produce the desired product may be conducted in the conventional manner usually employed in such reactions.

The treating agent or demulsifying agent contemplated by my process can also be produced by other methods which are well known. For example, monoglycerides are produced by the reaction of monochlorhydrin,

and the desired soap-forming carboxy acid, such as oleic acid, or the salt thereof, such as the sodium or potassium salt. Polyglycerol chlorhydrin can be manufactured in a manner similar to the procedure employed in the manufacture of monochlorhydrin, that is, reaction with dry hydrochloric acid at elevated temperatures; and such polyglycerol chlorhydrin can be employed in the same manner as monochlorhydrin is employed.

In some instances, it has been found possible to produce the acyl chloride of detergent-forming carboxy acids at a relatively low cost by means of sulfur chloride reactions. Such acyl chloride, for instance, stearyl chloride, may be reacted with any suitable polyhydric alcohol, such as di-glycerol, for example, to give a reagent of the type employed as the demulsifying agent in my present process.

Although reagents of the type employed in the present process have been used as the raw material for additional reactions in the production of various demulsifying agents, it is to be emphasized that the present process employs the various reagents described as such and without additional reaction. For instance, reagents of the kind herein described have previously been subjected to reaction with various di-basic acids, such as sulfuric acid, oxalic acid, sebacic acid, phthalic acid, maleic acid, etc., to produce effective demulsifying agents. Materials of the type employed in the present process have been converted into sulfonic acids of various kinds and have also been combined with monobasic acid, such as acetic acid. These various acid residues which have been introduced into a reagent of the type contemplated in the present process are referred to as extraneous acid residues in the sense that they are intrinsically foreign to both the non-sulfo, detergent-forming, monocarboxy acid, and also to the polyhydric alcohol.

In regard to the non-sulfo, detergent-forming, monocarboxy acids, I prefer to use the higher fatty acids and particularly the hydroxylated fatty acids, such as hydroxy-stearic acid, ricinoleic acid, diricinoleic acid, etc. For sake of economy, I prefer to use commercial polyglycerol, which consists almost entirely of di-, tri-, and tetraglycerol, together with a small amount of unpolymerized glycerol, and perhaps small amounts of even higher polyglycerols. Esterification is promoted in the most suitable manner.

In the manufacture of my preferred reagent, I use commercial polyglycerol, as described immediately above, and produce an ester by reaction with dehydrated ricinoleic acid bodies derived by the dehydration of ricinoleic acid in the conventional fat-splitting process, in which the free fatty acid is split from the glyceride (castor oil). Such process is usually referred to as the Twitchell process, or the Petroff process. Such processes, when applied to non-hydroxylated fatty acid glycerides, yield the fatty acids. When such process is applied to the glyceride of a hydroxylated fatty acid, that is, triricinolein, and especially if subsequent heating is employed, the resultant product may contain a major proportion of polyricinoleic acid, in addition to some monoricinoleic acid. For simplicity, such materials are referred to as dehydrated ricinoleic acid bodies, or polyricinoleic acid. As to a further description of these materials and their manufacture, see U. S. Patent No. 2,023,994, dated December 10, 1935, to De Groote and Wirtel.

In the manufacture of the preferred reagent, above referred to, I conduct the reaction so that there are at least two free hydroxy groups present in the polyglycerol residue after esterification. I have found that the most effective reagents, regardless of the carboxy acid employed, are obtained when two or more free hydroxy groups remain in the polyhydric alcohol residue. Naturally, where the polyhydric alcohol body contains four or more free hydroxyls, as in the case of polyglycerols, one might introduce more than one mol of a detergent-forming carboxy acid. Indeed, two dissimilar carboxy acids might be combined with the polyglycerol residue.

The reagent employed in my present process may be characterized by the following formula:

in which R.COO represents a non-sulfo, detergent-forming, mono-carboxy acid radical, T represents a polyhydric alcohol residue, such as a $C_3H_5$ or a $C_6H_{10}O$ residue, etc., and m indicates the numeral one or more, and R and T are both characterized by freedom from extraneous acid radicals.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc. may be employed as diluents. Similarly, the material or materials employed as the demulsifying agent of my process may be admixed with one or more of the solvents customarily used in connection with conventional demulsifying agents. Moreover, said material or materials may be used alone or in admixture with other suitable well known classes of demulsifying agents, such as demulsifying agents of the modified fatty acid type, the petroleum sulfonate type, the alkylated sulfo-aromatic type, etc.

The reagents employed in the present process may be somewhat hydrophobic in character, that is, the one free hydroxyl group in some instances may not endow the material with a true hydrophile character. In other instances, the presence of two or more free hydroxyl groups, especially if the material is derived from ricinoleic acid, may furnish the product with a true hydrophile character, and such materials will readily produce an aqueous sol.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ratio of 1 to 10,000, or 1 to 20,000, or 1 to 30,000, such an apparent insolubility in oil and water is not significant, because said reagents undoubtedly have solubility within the concentration employed. This same fact is true in regard to the material or materials employed as the demulsifying agent of my process. The agent employed in the present process may not be as effective in the majority of instances as some of the average conventional demulsifying agents, but one will find numerous instances of specific emulsions in which the present process will prove as effective as, or even more effective than, the generally available classes of demulsifying agents.

In practising my process, a treating agent or demulsifying agent of the kind above described is brought into contact with or cause to act upon the emulsion to be treated in any of the various ways, or by any of the various apparatus now generally employed to resolve or break petroleum emulsions with a chemical reagent, or may be employed co-jointly in combination with other non-chemical processes intended to effect demulsification.

Having thus described my invention, what I claim as new and desire to secure by Letters Patent is:

1. A process for breaking a petroleum emulsion of the water-in-oil type, which consists in subjecting the emulsion to the action of a demulsifying agent comprising a chemical compound of the formula type: $(R.COO)_m.T.(OH)_m$, in which R.COO represents a non-sulfo, detergent-forming, monocarboxy acid radical, T represents a polyhydric alcohol residue, and m indicates the numeral one or more, and R and T being additionally characterized by freedom from an extraneous acid residue.

2. A process for breaking a petroleum emulsion of the water-in-oil type, which consists in subjecting the emulsion to the action of a demulsifying agent comprising a chemical compound of the formula type: $(R.COO)_m.T.(OH)_m$, in which R.COO represents a non-sulfo, detergent-forming, monocarboxy acid radical derived from abietic acid, T represents a polyhydric alcohol residue, and m indicates the numeral one or more, and R and T being additionally characterized by freedom from an extraneous acid residue.

3. A process for breaking a petroleum emulsion of the water-in-oil type, which consists in subjecting the emulsion to the action of a demulsifying agent comprising a chemical compound of the formula type: $(R.COO)_m.T.(OH)_m$, in which R.COO represents a non-sulfo, detergent-forming, monocarboxy acid radical derived from naphthenic acid, T represents a polyhydric alcohol residue, and m indicates the numeral one or more, and R and T being additionally characterized by freedom from an extraneous acid residue.

4. A process for breaking a petroleum emulsion of the water-in-oil type, which consists in subjecting the emulsion to the action of a demulsifying agent comprising a chemical compound of the formula type: $(R.COO)_m.T.(OH)_m$, in which R.COO represents a monocarboxy fatty acid radical, T represents a polyhydric alcohol residue, and m indicates the numeral one or more, and R and T being additionally characterized by freedom from an extraneous acid residue.

5. A process for breaking a petroleum emulsion of the water-in-oil type, which consists in subjecting the emulsion to the action of a demulsifying agent comprising a chemical compound free from extraneous acid residues, of the formula type: $(R.COO)_m.T.(OH)_m$, in which R.COO represents a hydroxylated, monocarboxy fatty acid radical, T represents a polyhydric alcohol residue, and m indicates the numeral one or more, and R and T being additionally characterized by freedom from an extraneous acid residue.

6. A process for breaking a petroleum emulsion of the water-in-oil type, which consists in subjecting the emulsion to the action of a demulsifying agent comprising a chemical compound of the formula type: $(R.COO)_m.T.(OH)_m$, in which R.COO represents a hydroxylated monocarboxy fatty acid radical derived from ricinoleic acid, T represents a polyhydric alcohol residue, and m indicates the numeral one or more, and R and T being additionally characterized by freedom from an extraneous acid residue.

7. A process for breaking a petroleum emulsion of the water-in-oil type, which consists in subjecting the emulsion to the action of a demulsifying agent comprising a chemical compound of the formula type: $(R.COO)_m.T.(OH)_m$, in which R.COO represents a hydroxylated, monocarboxy fatty acid radical derived from ricinoleic acid, T is a residue derived from a glycerol body, and m indicates the numeral one or more, and R and T being additionally characterized by freedom from an extraneous acid residue.

8. A process for breaking a petroleum emulsion of the water-in-oil type, which consists in subjecting the emulsion to the action of a demulsifying agent comprising a chemical compound of the formula type: $(R.COO)_m.T.(OH)_m$, in which R.COO represents a hydroxylated, monocarboxy fatty acid radical derived from ricinoleic acid, T is a polyglycerol residue, and m indicates the numeral one or more, and R and T being additionally characterized by freedom from an extraneous acid residue.

9. A process for breaking a petroleum emulsion of the water-in-oil type, which consists in subjecting the emulsion to the action of a demulsifying agent comprising a chemical compound of the formula type: $(R.COO)_m.T.(OH)_m$, in which R.COO represents a hydroxylated, monocarboxy fatty acid radical derived from ricinoleic acid, T is a polyglycerol residue, and the first occurrence of m represents the numeral one, the second occurrence of m represents the numeral one or more, and R and T being additionally characterized by freedom from an extraneous acid residue.

10. A process for breaking a petroleum emulsion of the water-in-oil type, which consists in subjecting the emulsion to the action of a demulsifying agent comprising a chemical compound of the formula type: $(R.COO)_m.T.(OH)_m$, in which R.COO represents a hydroxylated, monocarboxy fatty acid radical derived from ricinoleic acid, T is a polyglycerol residue, the first occurrence of m represents the numeral one, and the second occurrence of m represents the numeral two or more.

MELVIN DE GROOTE.